(12) United States Patent
Kato

(10) Patent No.: US 12,065,049 B2
(45) Date of Patent: Aug. 20, 2024

(54) POWER FEEDING DEVICE

(71) Applicant: TOSHIBA TEC KABUSHIKI KAISHA, Tokyo (JP)

(72) Inventor: Masakazu Kato, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 417 days.

(21) Appl. No.: 17/349,076

(22) Filed: Jun. 16, 2021

(65) Prior Publication Data

US 2022/0161675 A1    May 26, 2022

(30) Foreign Application Priority Data

Nov. 24, 2020  (JP) ................. 2020-194474

(51) Int. Cl.
| | | |
|---|---|---|
| H02J 50/90 | (2016.01) | |
| B60L 53/12 | (2019.01) | |
| B60L 53/35 | (2019.01) | |
| H02J 7/02 | (2016.01) | |
| H02J 50/12 | (2016.01) | |
| H02J 50/40 | (2016.01) | |
| B62B 5/00 | (2006.01) | |

(52) U.S. Cl.
CPC ............. *B60L 53/35* (2019.02); *B60L 53/12* (2019.02); *H02J 7/02* (2013.01); *H02J 50/12* (2016.02); *H02J 50/40* (2016.02); *H02J 50/90* (2016.02); *B62B 5/0053* (2013.01)

(58) Field of Classification Search
CPC ..................................... H02J 50/90
USPC ....................................... 320/108
See application file for complete search history.

(56) References Cited

U.S. PATENT DOCUMENTS

| | | | | |
|---|---|---|---|---|
| 6,150,794 | A * | 11/2000 | Yamada | B60L 53/126 320/108 |
| 7,741,808 | B2 | 6/2010 | Fowler et al. | |
| 2001/0000283 | A1* | 4/2001 | Eberlein | H02J 7/0044 180/19.1 |

(Continued)

FOREIGN PATENT DOCUMENTS

| | | |
|---|---|---|
| EP | 3650310 A1 | 5/2020 |
| EP | 3713042 A1 | 9/2020 |
| EP | 3713043 A1 | 9/2020 |

OTHER PUBLICATIONS

Extended European Search Report dated Jan. 20, 2022 mailed in corresponding European Patent Application No. 21187422.7, 9 pages.

*Primary Examiner* — Edward Tso
*Assistant Examiner* — Ahmed H Omar
(74) *Attorney, Agent, or Firm* — Kim & Stewart LLP

(57) ABSTRACT

A cart charging station includes a supporting member, a power transmission device, and an engaging member. The power transmission device is coupled to the supporting member such that a power transmission surface thereof faces a power receiving surface of a power reception device mounted on a cart at the cart charging station. The power transmission device is configured to transmit electric power to the power reception device in a non-contact manner. The engaging member is configured to engage with the power reception device of the cart and restrict movement of the power reception device in a frontward direction and the width directions of the cart.

7 Claims, 9 Drawing Sheets

(56) References Cited

U.S. PATENT DOCUMENTS

| | | | |
|---|---|---|---|
| 2002/0070516 A1* | 6/2002 | Haas | B62B 5/049 |
| | | | 280/33.992 |
| 2019/0123587 A1* | 4/2019 | Titov | A61G 7/05 |
| 2020/0122762 A1 | 4/2020 | Kato | |
| 2020/0127498 A1 | 4/2020 | Kato et al. | |
| 2020/0127505 A1 | 4/2020 | Kato | |
| 2020/0298898 A1 | 9/2020 | Ogishima et al. | |
| 2020/0303953 A1 | 9/2020 | Oishi et al. | |

* cited by examiner

POWER FEEDING DEVICE

CROSS-REFERENCE TO RELATED APPLICATION

This application is based upon and claims the benefit of priority from Japanese Patent Application No. 2020-194474, filed on Nov. 24, 2020, the entire contents of which are incorporated herein by reference.

FIELD

Embodiments described herein relate generally to a power feeding device for a cart, such as a cart charging station.

BACKGROUND

A cart system of one type includes a processing terminal, such as a tablet terminal, and/or a barcode reader attached to a shopping cart. For example, such a cart system can support smoother shopping and settlement processing by a shopper himself or herself. A battery is mounted on the cart or the processing terminal. A method of charging the battery is required and thus methods for have been proposed for noncontact battery charging.

There is a power feeding device that includes a power transmission coil provided such that a power transmission surface is perpendicular to a floor surface and feeds electric power to a power reception coil provided on a side surface of a cart. There can also be a guiderail that guides the cart to a predetermined storage position in order for a power transmission coil and a power reception coil to perform suitable power reception and transmission. The guiderail is set to a size corresponding to the particular carts in use at the store location or the like.

However, a wheel width and a spacing between wheels may be different depending on a type of the cart. For that reason, once the guiderail is set, carts not compatible with the size of the guiderail may not be used.

DETAILED DESCRIPTION

An object of embodiments is to provide a power feeding device in which power transmission and reception surfaces can be aligned.

In general, according to an embodiment, a cart charging station includes a supporting member, a power transmission device, and an engaging member. The power transmission device is on the supporting member so that a power transmission surface faces a power receiving surface of a power reception device on a cart stationed at the cart charging station. The power transmission device is configured to transmit electric power to the power reception device in a non-contact manner. The engaging member is configured to engage the power reception device of the stationed cart and restrict movement of the power reception device of the cart in a frontward direction of the cart and width directions of the cart.

Examples of a shopping cart 1 mounted with a power feeding device 2 and a power reception device 23 that receives electric power transmitted from the power feeding device 2 according to embodiments are described below with reference to the drawings. The power feeding device 2 may be referred to as a cart charging station. The power feeding device 2 and the power reception device 23 need to be in a predetermined positional relation for a power transmission and reception system that can perform noncontact power feeding. In the following explanation, a direction along an advancing direction of the shopping cart 1 may be referred to as a front-rear direction and a direction crossing the front-rear direction and connecting left and right side surfaces of the shopping cart 1 may be referred to as a width direction.

Figure 1:
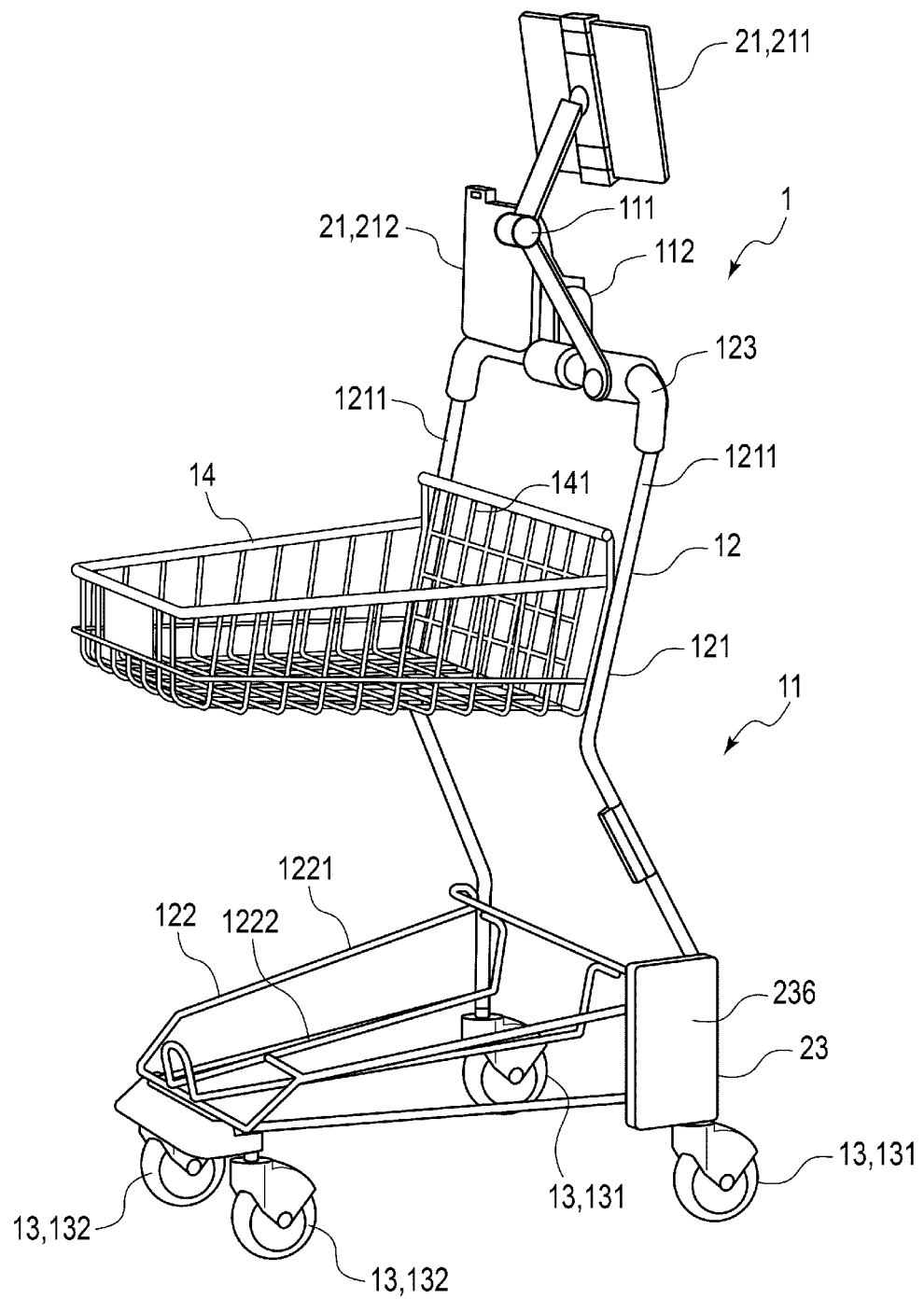
FIG. 1 illustrates a perspective view of a shopping cart with a power reception device that receives electric power transmitted from a power transmission device according to an embodiment.
Figure 2:
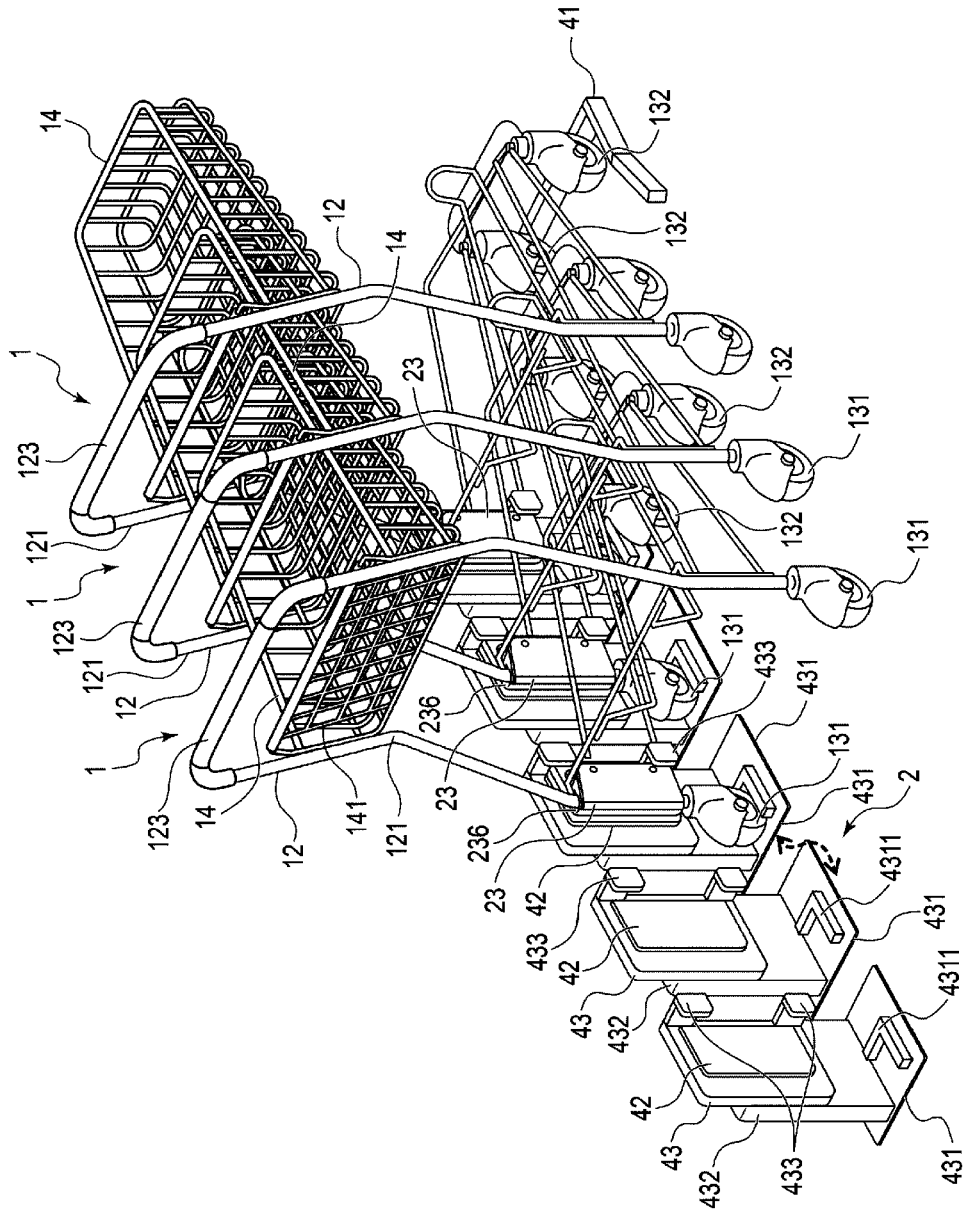
FIG. 2 illustrates a perspective view of a power feeding device according to an embodiment.

FIG. 1 illustrates a perspective view of the shopping cart 1 with the power reception device 23 that can be used to receive electric power transmitted from the power feeding device 2 according to an embodiment. FIG. 2 illustrates a perspective view of a configuration of the power feeding device 2 and an example of a relation between the power feeding device 2 and the shopping cart 1.

Figure 3:
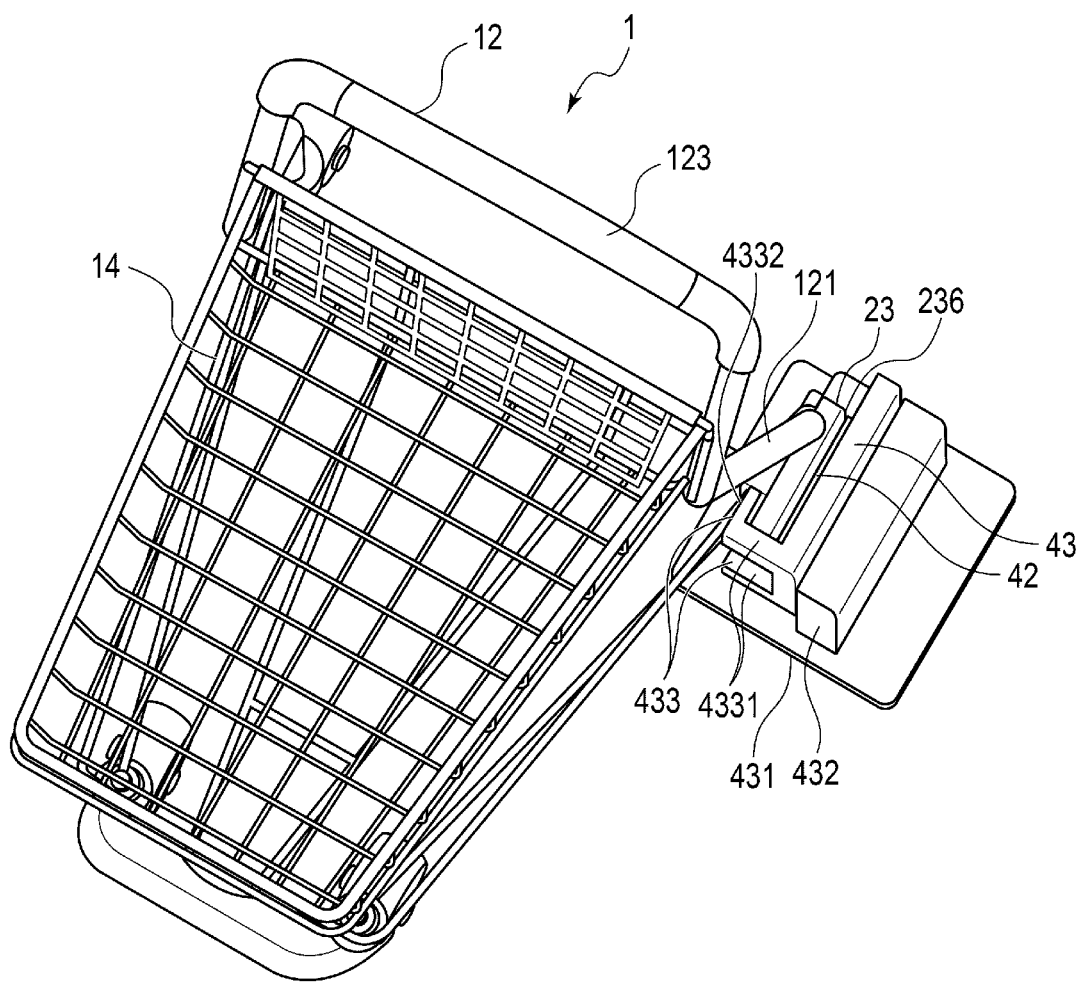
FIG. 3 illustrates a perspective view of the power feeding device according to the embodiment.
Figure 4:
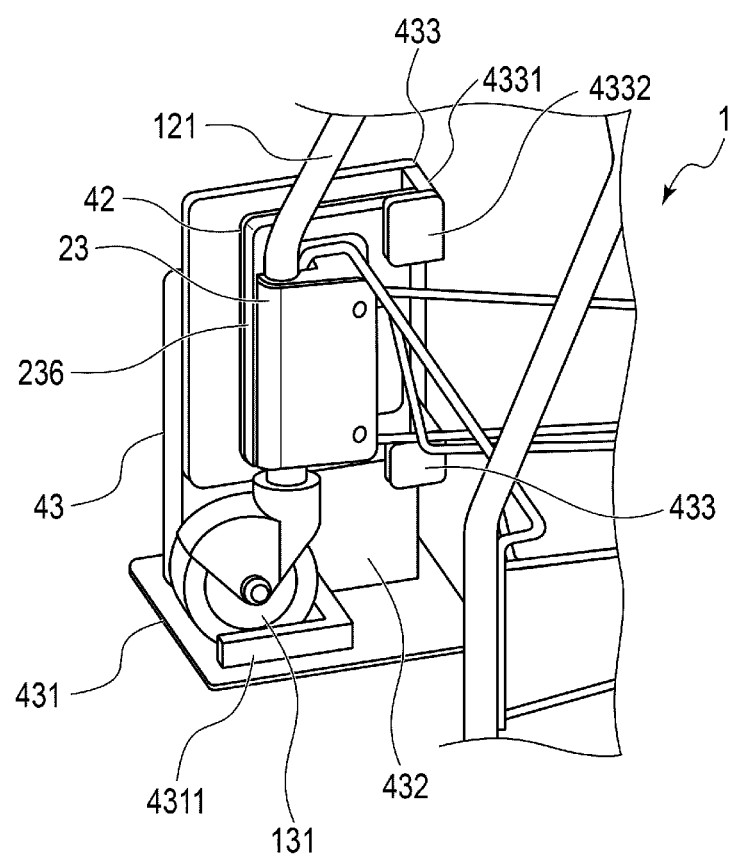
FIG. 4 illustrates a perspective view of a configuration of a power transmission device of the power feeding device according to the embodiment.

FIGS. 3 and 4 illustrate perspective views of a configuration of a power transmission device 42 of the power feeding device 2 and an example of a relation between the power transmission device 42 and the power reception device 23 of the shopping cart 1. FIGS. 3 and 4 illustrate the perspective views from different directions.

Figure 5:
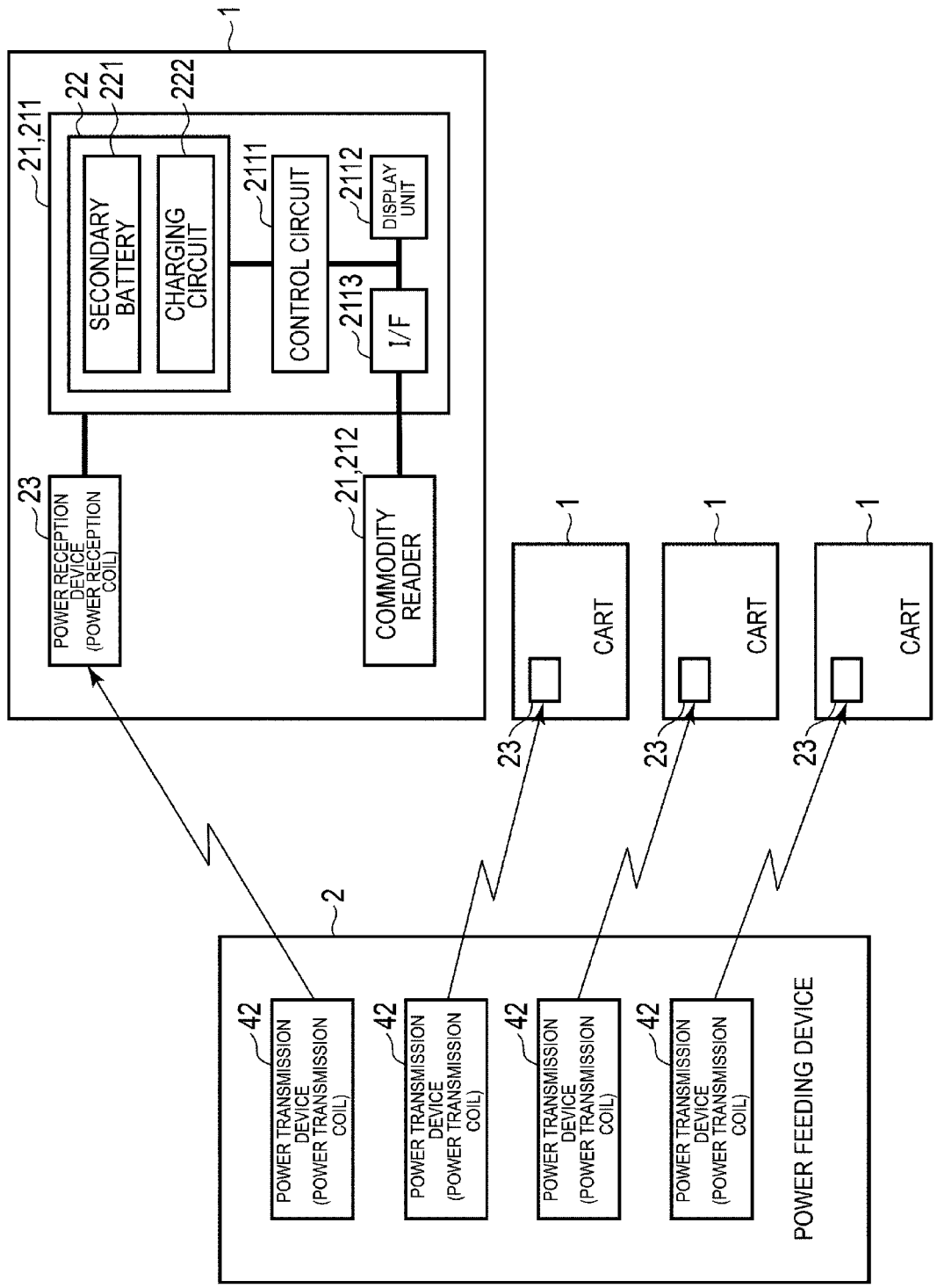
FIG. 5 is a block diagram of a power transmission and reception system in which a power feeding device and a power reception device according to an embodiment can be used.
Figure 6:
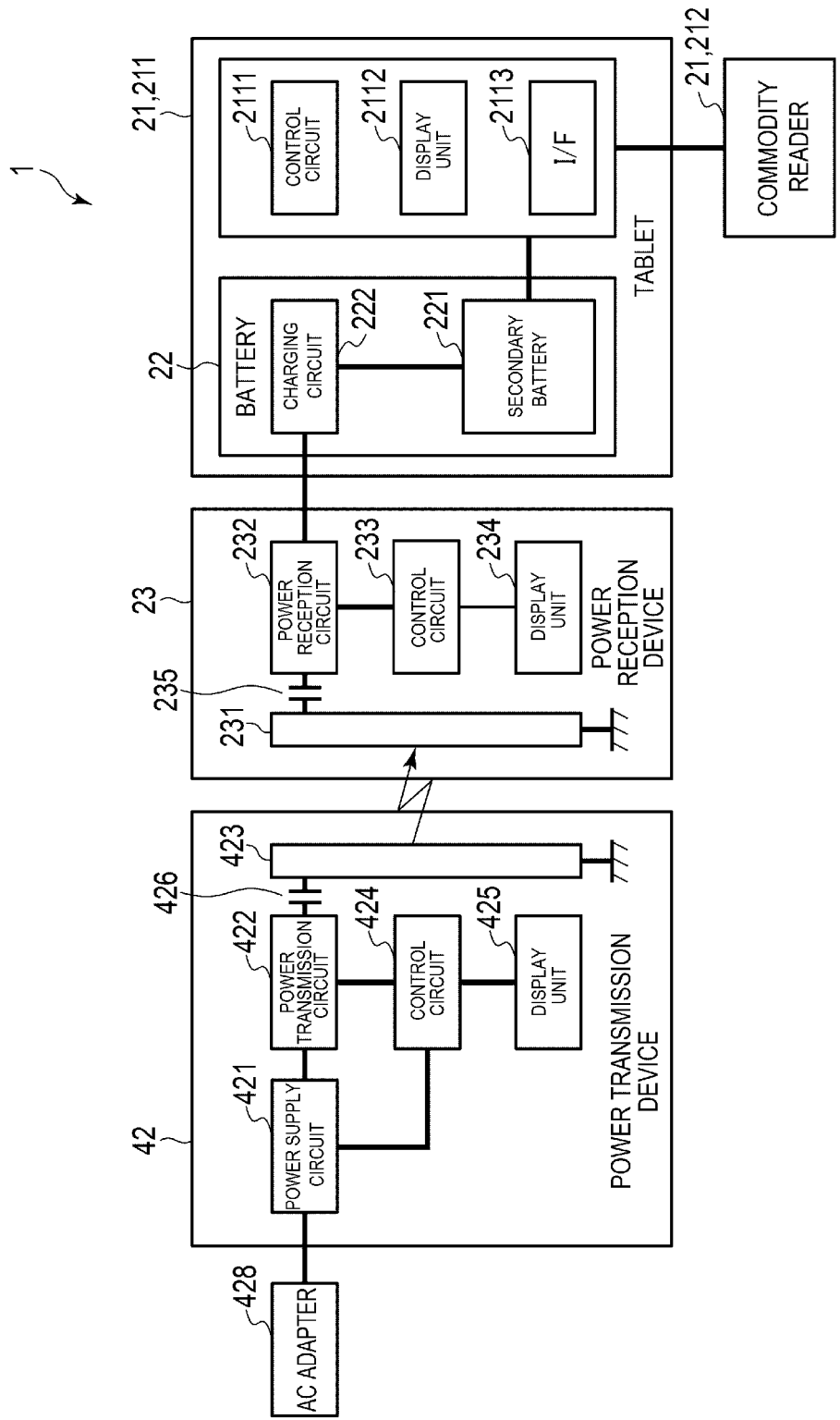
FIG. 6 is a block diagram of a power transmission and reception system according to an embodiment.

FIGS. 5 and 6 are block diagrams illustrating an example of a configuration of a power transmission and reception system in which the power feeding device 2 and the power reception device 23 according to the embodiment can be used.

First, the shopping cart 1 with the power reception device 23 is described with reference to FIG. 1.

The shopping cart 1 is an example of a mobile body on which the power reception device 23 is mounted. The power reception device 23 is configured to receive electric power transmitted from the power feeding device 2. In the following description, the shopping cart 1 is simply referred to as cart 1.

The cart 1 has the power reception device 23 mounted thereon. The power reception device 23 can receive electric power transmitted in a noncontact manner. "Noncontact" in this context means without a wired connection, plug connectors, or the like. Noncontact may refer to wireless (RF) transmissions, inductive coupling, or the like. The power reception device 23 supplies the received electric power to a battery of an electronic device mounted on the cart 1. The power feeding device 2 transmits electric power that is receivable by a power reception system mounted on the cart 1. For example, the power feeding device 2 forms part of a cart storage space where the cart 1 can be stored. The power feeding device 2 transmits electric power in a noncontact manner to the power reception device 23 mounted on the stored cart 1.

The battery charged by the power reception device 23 is, for example, a power supply device that supplies electric power to an electronic device mounted on the cart 1. The battery charged by the power reception device 23 may be included in the electronic device mounted on the cart 1. The battery charged by the power reception device 23 may be mounted on the cart 1 separately from the electronic device. In this present embodiment, the electronic device includes the battery.

In FIGS. 1 and 5, the cart 1 includes a cart main body 11 that is movable and stores commodities, an electronic device 21, a battery 22, and the power reception device 23. The electronic device 21 and the power reception device 23 can be attached to the cart main body 11. A plurality of carts 1 can be stacked front-to-rear for storage or the like.

The cart main body 11 moves when pushed by a user. The cart main body 11 stores commodities therein or alternatively holds a shopping basket for storing commodities. As illustrated in FIG. 1, the cart main body 11 includes a frame 12, a plurality of casters 13, and a storage basket 14.

The frame 12 includes, for example, a vertical frame 121, a horizontal frame 122, and a handle 123. Two casters (rear wheels) are provided at the lower end of the vertical frame 121. The handle 123 is provided at the upper end of the vertical frame 121. The vertical frame 121 extends in the up-down direction. The vertical frame 121 may partially incline or bend or may linearly extend. An extending direction of the vertical frame 121 may be along the up-down direction or may be inclined with respect to the up-down direction and can be set as appropriate.

The vertical frame 121 includes a pair of main frames 1211 disposed in the width direction of the cart 1 and extended in the up-down direction. A part of the pair of main frames 1211 is bent. The vertical frame 121 may include a subframe in addition to the pair of main frames 1211.

The horizontal frame 122 is integrally connected to the lower end side of the vertical frame 121. The horizontal frame 122 extends in the front-rear direction. The horizontal frame 122 may partially incline or bend or may linearly extend. An extending direction of the horizontal frame 122 may be along the front-rear direction or may be inclined with respect to the front-rear direction and can be set as appropriate. Two casters 13 $c$ (front wheels) are provided on the lower surface on the distal end side of the horizontal frame 122. The horizontal frame 122 includes, for example, a base frame 1221 on which the casters 13 are provided and a subframe 1222 provided further on the inner side or the lower side than the base frame 1221.

The base frame 1221 decreases in width from the rear toward the front in this example. The base frame 1221 is set to have a width for enabling a shopping basket to be placed inside. The base frame 1221 is formed to become narrower from the rear to the front side. The base frame 1221 has, for example, a width the same as the width of the pair of main frames 1211. Two casters 13 forming the front wheels are provided at the lower ends of two parts on the lower surface in the front of the base frame 1221.

The subframe 1222 extends in the front-rear direction. The subframe 1222 is disposed on the inner side of the base frame 1221. When a shopping basket is placed in the base frame 1221, the subframe 1222 supports the shopping basket. When the carts 1 are stacked, the distal end of the subframe 1222 comes into contact with the subframe 1222 of the other cart 1 to hold the adjacent stacked carts 1 in a predetermined positional relation.

The handle 123 is provided at the upper end of the vertical frame 121. The handle 123 is provided, for example, at the upper ends of the pair of main frames 1211 to be laid across the pair of main frames 1211. The handle 123 is gripped by the user and pressed in the traveling direction by the user to move and turn the cart main body 11. The handle 123 may be provided at each of the upper ends of the pair of main frames 1211.

For example, four casters 13 are provided. The four casters 13 are disposed at the lower ends of the frame 12. As a specific example, among the four casters 13, two casters 13 are provided as rear wheels 131 at the lower ends of the pair of main frames 1211 of the vertical frame 121.

Two casters 13 are provided as front wheels 132 on the lower surface on the front end side of the base frame 1221 of the horizontal frame 122. An interval between two rear wheels 131 is wider than the interval between two front wheels 132.

For example, the casters 13 are joined to the frame 12. As a specific example, the rear wheels 131 are fixed to the lower ends of the pair of main frames 1211 of the vertical frame 121. The front wheels 132 are fixed to two parts on the front lower surface of the base frame 1221 of the horizontal frame 122.

The storage basket 14 stores commodities or holds a shopping basket storing commodities. The storage basket 14 can be formed in a box shape opening upward by a perforated panel member or a mesh wire member. For example, the storage basket 14 is integrally joined to the vertical frame 121. For example, the storage basket 14 is fixed to the pair of main frames 1211 of the vertical frame 121 and supported. The storage basket 14 is formed to become narrower from the rear to the front side in the advancing direction. The storage basket 14 includes, on the rear end side, an opening and closing section 141 that is capable of swinging with the lower end free and the upper end set as a rotation point. The size in the width direction and the size in the height direction of the storage basket 14 are set to be larger on the rear end side, which is the opening and closing section 141, than on the front end side.

If a plurality of such cart main bodies 11 are placed in a row and pushed together for storage, the cart main body 11 in the rear pushes up the opening and closing section 141 of the cart main body 11 in the front. The storage baskets 14 of the cart main bodies 11 in the front and the rear thus overlap. The horizontal frame 122 of the cart main body 11 in the rear is inserted from between the pair of main frames 1211 of the cart main body 11 in the front and is stored in the base frame 1221 of the horizontal frame 122 of the cart main body 11 in the front. The subframe 1222 of the cart main body 11 in the rear comes into contact with the subframe 1222 of the cart main body 11 in the front. A positional relation between the adjacent cart main bodies 11 in the front and the rear becomes a fixed positional relation. Consequently, the carts 1 can be stacked front to the rear and stored.

The electronic device 21 is a device for provision of information to the user and/or provision of a service(s) to the user. One or more electronic devices 21 can be provided. An example of an electronic device 21 is illustrated in FIGS. 1, 4, and 5. However, the electronic device 21 is omitted in other figures for sake of clarity.

The electronic device 21 is attached to the cart main body 11. In FIG. 1, the electronic device 21 is held by the handle 123 of the cart main body 11. As illustrated in FIG. 5, the electronic device 21 includes the battery 22. An electronic device 21 may have a function or a configuration for displaying commodity information, store information, and the like. For example, an electronic device 21 may have a function or a configuration for performing processing such as image processing, commodity reading processing, product registration processing, and transaction settlement processing based on commodity information such as a commodity code.

As a specific example, the electronic device 21 is an information terminal, such as a tablet terminal, for providing information to the user, a commodity reader for acquiring information concerning a commodity selected by the user, or a card reader for reading a credit card, a member card, and the like. The electronic device 21 may also be a charging device for charging, with electronic power received from the battery 22, an electronic device or a portable terminal carried by the user. Examples of a portable terminal that might be carried by the user include a cellular phone, a smartphone, a digital camera, and a tablet terminal. However, the portable terminal is not limited to these devices.

In the example illustrated in FIGS. 1 and 5, the cart 1 includes a tablet terminal 211 and a commodity reader 212 as electronic devices 21. The tablet terminal 211 is, for example, a processing terminal including a control circuit 2111 including a processor and a memory, a display unit 2112 such as a display including a touch panel, and an I/F unit 2113 connected to another electronic device 21. In the present embodiment, the tablet terminal 211 incorporates the battery 22 therein. The tablet terminal 211 has the display unit 2112 directed towards a user on the handle 123 side. As a specific example, the tablet terminal 211 is provided in the handle 123 via an arm shaft 111 (the height and the posture of which can be changed) attached to the handle 123.

The tablet terminal 211 may be fixed directly to the frame 12. That is, various attaching structures and methods for tablet terminal 211 can be selected. The electronic device 21 may be attached to the frame 12 such that the posture and the height thereof can be changed, may be attached such that only the posture or only the height thereof can be changed, or may be fixed to the frame 12 such that the posture and the height thereof cannot be changed.

The tablet terminal 211 displays, on the display unit 2112, information concerning a commodity read by the commodity reader 212. The tablet terminal 211 may perform settlement processing for the commodity read by the commodity reader 212.

The commodity reader 212 reads information from a commodity. The commodity reader 212 can be a scanner that reads commodity identification information such as a barcode on a commodity put in and taken out from the storage basket 14. As a specific example, the commodity reader 212 is provided in the handle 123 via a holder 112 or the like attached to the handle 123 and having a posture fixed with a reading unit, which reads information concerning a commodity, directed to the front or toward the storage basket 14.

The commodity reader 212 may incorporate the battery 22 and include a control circuit including a processor and a memory, a reading unit that reads commodity identification information, a display unit that displays information, and an I/F unit connected to another electronic device 21 such as the tablet terminal 211.

The commodity reader 212 may also or instead be an RFID tag reader for reading an RFID tag or the like attached to a commodity. The commodity reader 212 may be part of the tablet terminal 211 or a portable terminal carried by the user. If the tablet terminal 211 or the portable terminal is the commodity reader 212, processing for reading commodity identification information such as a barcode can be performed. In some examples, processing associated with imaging a commodity to obtain the commodity identification information from a captured image can be performed. A camera may be provided in the tablet terminal 211 or in a portable terminal carried by the user. A card reader 213 reads a credit card, a member card, or the like for the user.

The electronic device 21 may be, instead of the tablet terminal 211, an interface device for connecting the user's own portable terminal. A user's portable terminal connected to the interface device functioning as the electronic device 21 may perform the same processing as the processing of the tablet terminal 211 described above. The interface device functioning as the electronic device 21 may charge a battery included in the user's portable terminal. The interface device functioning as the electronic device 21 may incorporate the battery 22 or may be connected to the battery 22 provided separately from the interface device.

The battery 22 is a power supply device for enabling the electronic device 21 to operate. The battery 22 is incorporated in, for example, the electronic device 21. For example, as illustrated in FIG. 5, the battery 22 is incorporated in, for example, the tablet terminal 211. The battery 22 may be a battery incorporated in the commodity reader 212, the tablet terminal 211, or separately provided. The battery 22 includes a secondary battery 221 that stores electric power and a charging circuit 222 that charges the secondary battery 221 with electric power received from the power reception device 23. The battery 22 may be a power supply device provided on the outside of the electronic device 21. The secondary battery 221 and the charging circuit 222 may be housed in a battery case of the battery 22. The battery 22 only has to be configured to supply the electric power stored in the secondary battery 221 to the electronic device 21.

The secondary battery 221 is charged by charging power supplied from the charging circuit 222.

The charging circuit 222 supplies the electric power supplied from the power reception device 23 to the secondary battery 221 as electric power for charging (charging power). For example, the charging circuit 222 converts electric power supplied from a power reception circuit 232 described below of the power reception device 23 into a direct current (charging power) used for charging the secondary battery 221. That is, the charging circuit 222 converts the electric power supplied from the power reception circuit 232 into charging power having a predetermined current value and a predetermined voltage value for charging the secondary battery 221 and supplies the charging power to the secondary battery 221.

The power reception device 23 receives electric power transmitted from a power transmission device functioning as an external device. The power reception device 23 charges the battery 22 with the received electric power. The power reception device 23 supplies the received electric power to the electronic device 21 or the battery 22.

The power reception device 23 is attached to the frame 12 of the cart main body 11. For example, as illustrated in FIG. 1, the power reception device 23 is provided to range over the vertical frame 121 and the horizontal frame 122. As a specific example, the power reception device 23 is attached to a side at the rear end of the frame 12. The power reception device 23 is provided to span between the vertical frame 121 and the horizontal frame 122 such that the power reception surface at which a power reception coil 231 receives electric power (from a power transmission coil on a power transmission side) will be parallel to or substantially parallel to a power transmission surface.

The power reception device 23 receives electric power output from the power transmission device 42 in the power feeding device 2. The power reception device 23 is disposed such that the power reception coil 231, which is the power reception surface of the power reception device 23, faces a power transmission coil 423, which is the power transmission surface of the power transmission device 42 in the power feeding device 2.

As illustrated in FIG. 6, the power reception device 23 includes the power reception coil 231, the power reception circuit 232, a control circuit 233, a display unit 234, and a capacitor for resonance 235. The power reception device 23 is configured by, for example, housing the power reception coil 231, the power reception circuit 232, the control circuit 233, the display unit 234, and the capacitor for resonance 235 in a case 236.

The power reception coil 231 receives electric power from the power transmission device 42 and supplies the electric power to the power reception circuit 232. In the power reception coil 231, the power reception surface for receiving electric power is formed in a flat shape. The power reception surface of the power reception coil 231 is provided on the frame 12 of the cart main body 11, for example, with the power reception surface of the power reception coil 231 being disposed to be parallel to the power transmission surface of the power transmission coil 423. The power reception coil 231 can be connected in series or in parallel to the capacitor for resonance 235 for power reception to thereby configure a resonance circuit (a power reception resonance circuit).

When approaching the power transmission coil 423 of the power transmission device 42, the power reception coil 231 (functioning as the power reception resonance circuit) electromagnetically couples to the power transmission coil 423. In the power reception coil 231, an induction current is generated by a magnetic field output from the power transmission coil 423 of the power transmission device 42. The power reception coil 231 may be configured as a wound structure obtained by winding an insulated electric wire or may be configured by forming a coil pattern on a printed board.

The power reception coil 231 supplies received AC power to the power reception circuit 232. In other words, the power reception coil 231 functions as an AC power supply while receiving the AC power from the power transmission device 42. For example, if a magnetic field resonance scheme is used for power transmission, a self-resonance frequency of the power reception resonance circuit functioning as the power reception coil 231 is set to substantially the same frequency as a frequency of power transmission by the power transmission device 42. As a result, power transmission efficiency in the electromagnetic coupling of the power reception coil 231 and the power transmission coil 423 is improved.

The power reception circuit 232 converts received power supplied from the power reception coil 231 into electric power suppliable to the battery 22. For example, the power reception circuit 232 rectifies the received power supplied from the power reception coil 231 and converts the received power into a direct current. Such a power reception circuit 232 is achieved by, for example, a circuit including a rectifying bridge configured by a plurality of diodes. In this case, a pair of input terminals of the rectifying bridge is connected to the power reception resonance circuit configured from the power reception coil 231 and the capacitor for resonance 235. The power reception circuit 232 full-wave rectifies the received power supplied from the power reception coil 231 to thereby output DC power from a pair of output terminals.

The control circuit 233 controls the operations of the power reception circuit 232 and the display unit 234. The control circuit 233 includes a processor and a memory. The processor executes arithmetic processing. The processor performs various kinds of processing based on, for example, a program stored in the memory and data used in the program. The memory stores the program, the data used in the program, and the like. The control circuit 233 may be configured by a microcomputer and/or an oscillation circuit or the like. For example, the control circuit 233 switches a display state (e.g., color) or display contents of the display unit 234 according to a state of the power reception device 23.

The display unit 234 is a display device that displays various kinds of information. For example, the display unit 234 is an indicator indicating a state of the power reception device 23. The display unit 234 switches display according to control by the control circuit 233. For example, the display unit 234 is an LED and switches lighting, extinction, or a display color according to an operation state of the power reception device 23. The display unit 234 may display the operation state as a message on a liquid crystal screen.

In the power reception device 23, a wireless communication circuit for performing wireless communication with the power transmission device 42 corresponding to the power reception device 23 may be provided. For example, the wireless communication circuit is a circuit that performs wireless communication at a frequency different from a frequency of power transmission. If the wireless communication circuit is provided in the power reception device 23, the control circuit 233 may perform wireless communication with the power transmission device 42 through the wireless communication circuit to thereby perform control of the units. The wireless communication circuit may perform wireless communication at the same frequency as the frequency of the power transmission using load modulation.

The power feeding device 2 is described with reference to FIGS. 2 to 8.

As illustrated in FIG. 2, the power feeding device 2 includes a cart guide 41, a plurality of power transmission devices 42, and one or more supporting members 43. In the present embodiment, the supporting members 43 and the power transmission devices 42 are provided in the same number.

The cart guide 41 is provided in a cart storage space where the carts 1 are stacked and stored. The cart guide 41 guides the position of the first cart 1 among the stacked carts 1. The car guide 41 may be referred to as a front wheel guide. For example, the width of the cart guide 41 is set larger on the rear side than the front side in the traveling direction of the cart 1. An end portion of the cart guide 41 comes into contact with the front wheels 132 of the cart main body 11 and can control the position of the first cart 1 in the traveling direction. If the cart guide 41 can at least control the position of the first cart 1 among the stacked carts 1, the shape and the configuration of the cart guide 41 can be varied as appropriate.

As illustrated in FIG. 6, the power transmission device 42 includes a power supply circuit 421, a power transmission circuit 422, a power transmission coil 423, a control circuit 424, a display unit 425, and a capacitor for resonance 426.

The power transmission device 42 includes an AC adapter 428 connected to the power supply circuit 421 and connected to, for example, a power supply of a store. For example, the power supply circuit 421, the power transmission circuit 422, the power transmission coil 423, the control circuit 424, the display unit 425, and the capacitor for resonance 426 are integrally provided in a casing or the like and respectively disposed in the supporting members 43. For example, if a plurality of components of the power transmission device 42 are separately configured, at least a component including the power transmission coil 423 is disposed in the supporting member 43.

The power supply circuit 421 converts a voltage of a DC power supply from the outside into a voltage suitable for the operations of the circuits. The power supply circuit 421 generates electric power for enabling the power transmission circuit 422 to perform power transmission and supplies the electric power to the power transmission circuit 422. The power supply circuit 421 generates electric power for enabling the control circuit 424 to operate and supplies the electric power to the control circuit 424.

The power transmission circuit 422 generates transmission power to be transmitted from the power transmission coil 423. The power transmission circuit 422 supplies the generated transmission power to the power transmission coil 423. For example, the power transmission circuit 422 switches, based on control by the control circuit 424, DC power supplied from the power supply circuit 421 to AC power serving as transmission power.

The power transmission coil 423 outputs, according to the transmission power supplied from the power transmission circuit 422, electric power receivable by the power reception device 23. In the power transmission coil 423, a power transmission surface for transmitting electric power is formed in a plane shape. The power transmission surface of the power transmission coil 423 is disposed in the supporting member 43 in a posture orthogonal to the floor surface and to face the power reception surface of the power reception coil 231 of the power reception device 23.

For example, the power transmission coil 423 is connected in series or parallel to the capacitor for resonance 426 to thereby configure a resonance circuit (a power transmission resonance circuit). If AC power is supplied from the power transmission circuit 422, the power transmission coil 423 functioning as the power transmission resonance circuit generates a magnetic field corresponding to the supplied AC power. The power transmission coil 423 may be configured as a wound structure obtained by winding an insulated electric wire or may be configured by forming a coil pattern on a printed board.

The control circuit 424 controls the operations of the power transmission circuit 422 and the display unit 425. The control circuit 424 includes a processor and a memory. The processor executes arithmetic processing. The processor performs various kinds of processing based on, for example, a program stored in the memory and data used in the program. The memory stores the program, the data used in the program, and the like. The control circuit 424 may be configured by a microcomputer and/or an oscillation circuit or the like.

For example, the control circuit 424 switches a display state (e.g., color) or display contents of the display unit 425 according to a state of the power transmission device 42. The control circuit 424 controls a frequency of AC power output from the power transmission circuit 422 and controls ON and OFF of the operation of the power transmission circuit 422. For example, the control circuit 424 controls the power transmission circuit 422 to thereby switch to a state (a power transmission state) causing the power transmission coil 423 to generate a magnetic field or a standby state not causing the power transmission coil 423 to generate a magnetic field. The control circuit 424 may perform control for causing the power transmission coil 423 to intermittently generate a magnetic field and changing timing for transmitting electric power.

The display unit 425 can be an indicator indicating a state of the power transmission device 42. The display unit 425 switches display according to the control by the control circuit 424. For example, the display unit 425 is an LED and switches lighting, extinction, or a display color according to an operation state of the power transmission device 42. The display unit 425 may display the operation state as a message on a liquid crystal screen.

The supporting member 43 is provided on the floor surface on which the power supply device 2 is set. The supporting member 43 supports the power transmission device 42 in a posture in which the power transmission surface of the power transmission coil 423 is parallel to the power reception coil 231 of the power reception device 23 of the cart 1. The supporting member 43 holds the cart 1 in a predetermined position. The plurality of supporting members 43 respectively support the power transmission devices 42 and are disposed at equal intervals along the traveling direction of the cart main body 11.

A disposition interval for the plurality of supporting members 43 is an interval at which, when the carts 1 are stacked, the power reception devices 23 of the carts 1 and the power transmission devices 42 supported by the supporting members 43 are opposite to one another (in a facing arrangement).

As a specific example, the supporting member 43 includes a base 431, a wall section 432, and engaging sections 433. The base 431 is formed in, for example, a rectangular plate shape. The rear wheel 131 on a side where the power reception device 23 is provided of the cart main body 11 can be disposed on the upper surface of the base 431. The base 431 supports the wall section 432. The base 431 includes, on the upper surface, a rear wheel guide 4311 that controls the position of the rear wheel 131 of the cart main body 11.

The rear wheel guide 4311 guides, for example, a position in the front in the traveling direction and a position in the width direction of the rear wheel 131. As a specific example, if the rear wheel 131 is disposed on the base 431, the rear wheel guide 4311 guides the position of the rear wheel 131 such that the power transmission device 42 supported by the supporting member 43 and the power reception device 23 of the cart main body 11 are in a predetermined positional relation. The rear wheel guide 4311 is, for example, an L-shaped protrusion, the rear side of the base 431 of which is open and an end portion of which continues to the wall section 432. In other words, the rear wheel guide 4311 is a protrusion extending along the traveling direction of the cart main body 11 and the width direction orthogonal to the traveling direction.

The wall section 432 is formed in, for example, a plate shape. The wall section 432 is provided on the base 431, for example, in a posture in which a principal plane of the wall section 432 extends along the traveling direction of the cart main body 11. The wall section 432 supports the power transmission device 42 on a principal plane opposed to the cart main body 11. The wall section 432 may include the power transmission device 42 therein rather than support the power transmission device 42 thereout.

The engaging sections 433 are guides that engage with the power reception device 23 to perform alignment of the power reception device 23 and the power transmission device 42. Each of the engaging sections 433 may be referred to as an engaging member. The engaging sections 433 come into contact with, in the traveling direction of the cart main body 11, the front end of the case 236 of the power reception device 23 and a surface on the opposite side of a surface of the case 236 opposed to the power transmission device 42 or are slightly separated from and opposed to the front end or the surface to define the position of the power reception device 23. For example, the engaging sections 433 are provided in two parts on the upper end side and the center side of the wall section 432.

As a specific example, as illustrated in FIGS. 3 and 4, the engaging sections 433 are configured by first plate sections 4331 provided along the width direction of the cart main body 11 from the front end portion of the wall section 432 and second plate sections 4332 extending rearward in a direction along the traveling direction of the cart main body 11 from the end portions in the width direction of the first plate sections 4331. The first plate sections 4331 and the second plate sections 4332 are in contact with or opposed to the case 236 of the power reception device 23, whereby the engaging sections 433 guide the positions in the traveling direction and the width direction of the power reception device 23.

The engaging sections 433 are set to a shape for bringing the power transmission coil 423 of the power transmission device 42 and the power reception coil 231 of the power reception device 23 into a predetermined distance relation for enabling efficient power feeding if the position of the power reception device 23 is guided. The case 236 of the power reception device 23 may be fit in the engaging sections 433 to define the position of the power reception device 23 and restrict movement of the cart main body 11.

In such a power feeding device 2, the cart guide 41 and the plurality of supporting members 43, in which the plurality of power transmission devices 42 are provided, are set on the floor surface of the cart storage space. If the cart guide 41 and the supporting members 43 are not moved by the cart 1, the cart guide 41 and the supporting members 43 are set on the floor surface as appropriate. For example, the cart guide 41 and the supporting members 43 may be fixed to the floor surface by bolts or the like, may be fixed to the floor surface by an adhesive, or may be fixed to the floor surface by another method. If the cart guide 41 and the supporting members 43 do not move when the cart 1 is stored, the cart guide 41 and the supporting members 43 may not be fixed to the floor surface.

If the cart 1 is stored to be capable of feeding power to the power feeding device 2, first, the head cart 1 is advanced until the front wheels 132 come into contact with the cart guide 41. At the same time, as indicated by arrows in FIG. 2, the rear wheel 131 is moved to the inside of the rear wheel guide 4311 of the base 431 on which the rear wheel 131 is disposed. The next cart 1 is stacked in the already stored cart 1 and, as indicated by the arrows in FIG. 2, the rear wheel 131 is moved to the rear wheel guide 4311 of the base 431 on which the rear wheel 131 is disposed. Consequently, the carts 1 are stored in the cart storage space.

With the power feeding device 2 configured in this way, a pair of front wheels 132 of the head cart 1 is guided by the cart guide 41. The distal end portions of the carts 1 other than the head cart 1 are stacked in the carts 1 located in the front and are stored. Consequently, the position in the traveling direction of the cart 1 is guided by the cart guide 41 or the cart 1 in the front, the engaging sections 433, and the rear wheel guide 4311. The position in the width direction of the cart 1 is guided by the engaging sections 433 and the rear wheel guide 4311.

Forward movement the cart 1 stored in the cart storage space is restricted by the cart guide 41 or another cart 1 in the front of the cart 1, the engaging sections 433, and the rear wheel guide 4311 and movement in the width directions of the cart 1 is restricted by the engaging sections 433 and the rear wheel guide 4311. At this time, the power reception coil 231 of the power reception device 23 is opposed to the power transmission coil 423 of the power transmission device 42 at a preset distance for enabling efficient power transmission in noncontact power feeding. That is, the power feeding device 2 can set the position of the power reception coil 231 in a positional relation suitable for power feeding with respect to the power transmission coil 423 and maintain such a positional relation.

Therefore, the power reception device 23 and the power feeding device 2 are capable of performing efficient power transmission. In the power feeding device 2, the power transmission and reception surfaces of the power reception device 23 and the power transmission device 42 can be aligned by the cart guide 41, the rear wheel guide 4311, and the engaging sections 433. Accordingly, the power feeding device 2 can be configured not to include the guiderail for defining the position of the cart 1. Accordingly, the power feeding device 2 can be reduced in size.

In the power feeding device 2, the power transmission device 42 is provided in the wall section 432 of the supporting member 43 and the base 431 is set on the floor surface. Therefore, even if a type of the cart 1 used in the store is changed, the power feeding device 2 is capable of performing suitable power feeding if the disposition position of the power transmission device 42 is changed.

That is, when a cart type used in a store is changed, the size, dimensions, shapes, and the like of the cart and its rear wheels, frame, and power reception device may be different from the cart type in use previously at the store. If so, the power feeding device 2 that was set to enable efficient power transmission to the previous cart type before the change might not be useable with the new cart type.

However, with the power feeding device 2 in the present embodiment, the base 431 for supporting the power transmission device 42 only has to be set, via the wall section 432, in a position where the power reception coil 231 and the power transmission coil 423 of the stored cart 1 are at an appropriate distance for enabling efficient power transmission by noncontact power feeding. Therefore, if the type of the cart 1 used in the store is changed, by changing a position of the base 431 according to a shape of the new cart 1, it is possible to adjust the position of the power transmission coil 423 for the power reception coil 231 of the new cart 1. Accordingly, with the power feeding device 2, it is unnecessary to significantly change a layout or setup a new power feeding device for a new cart 1 of a different type. In the power feeding device 2, since the guiderail is unnecessary, if the type of the cart 1 in use is changed, it is unnecessary to, for example, change setting of the guiderail.

In the power feeding device 2, the power transmission and reception surfaces of the power reception device 23 and the power transmission device 42 can be aligned by changing the disposition of the base 431. Therefore, the power feeding device 2 can be applied to various carts 1. Further, in the power feeding device 2, the number of the power transmission devices 42 can be changed according to the number of stacked carts 1. Accordingly, the power feeding device 2 has a high degree of freedom in application thereof.

With the power feeding device 2, it is possible to align the power transmission and reception surfaces.

The configurations of the power feeding device 2, the cart 1, and the like are not limited to the specific configurations described above. For example, the power transmission device 42 may include a wireless communication circuit for performing wireless communication. For example, the wireless communication circuit is a circuit that performs wireless communication at a frequency different from a frequency of power transmission. The control circuit 424 of the power transmission device 42 may perform control of the units by performing wireless communication with the power reception device 23 through the wireless communication circuit. The wireless communication circuit may perform the wireless communication at the same frequency as the frequency of the power transmission using load modulation.

In the example described above, the power feeding device 2 is configured with the base 431 and the engaging sections 433 so as to restrict the movement to the front in the traveling direction and the movement in the width directions of the cart 1. However, the power feeding device 2 is not limited to this. For example, like a power feeding device 2 according to another embodiment illustrated in FIG. 7, a power feeding device 2 may be configured to restrict movement to the rear in a traveling direction of the cart 1. The restriction of the rearward movement of the cart 1 in this context means that the cart 1 is prevented from easily moving from the state in which the power transmission and reception surfaces are aligned due to a cause such as a shock associated with the stacking of additional carts 1 or the like, but does not include preventing the rearward movement of the cart 1 by a user such as when a user wishes to withdraw a cart 1 from a stack of carts 1. For example, a component that restricts the rearward movement of the cart 1 is a protrusion 4312 provided behind the rear wheel guide 4311 of the base 431. The protrusion 4312 is preferably set to height lower than the rear wheel guide 4311 as height for allowing the rear wheel 131 to easily run on the protrusion 4312. The protrusion 4312 may be referred to as a wheel restricting member.

A component that restricts the rearward movement of the cart 1 in another example is a restricting member 4313 with which the vertical frame 121 provided in the wall section 432 or the case 236 of the power reception device 23 comes into contact. If the rear wheel 131 and a case 26 of the power reception device 23 are disposed in the rear wheel guide 4311 and the engaging sections 433, the restricting member 4313 comes into contact with the vertical frame 121 or the case 236 or is located on the rear in the traveling direction of the vertical frame 121 or the case 236. For example, the restricting member 4313 is formed to be elastically deformable. For example, the restricting member 4313 is a rubber plate, a brush, or the like.

That is, if the cart 1 moves rearward, the vertical frame 121 or the power reception device 23 comes into contact with the restricting member 4313, whereby the restricting member 4313 restricts movement of the cart 1 until a sufficient force is applied to the cart 1. For example, if the user moves the cart 1 rearward, the restricting member 4313 is elastically deformable to permit movement of the cart 1. In the power feeding device 2, both of the protrusion 4312 and the restricting member 4313 may be provided or one of the protrusion 4312 and the restricting member 4313 may also be provided. For example, in the power feeding device 2, an upper surface present in the rear wheel guide 4311 of the base 431 may be recessed to restrict rearward movement of the cart 1.

Figure 7:
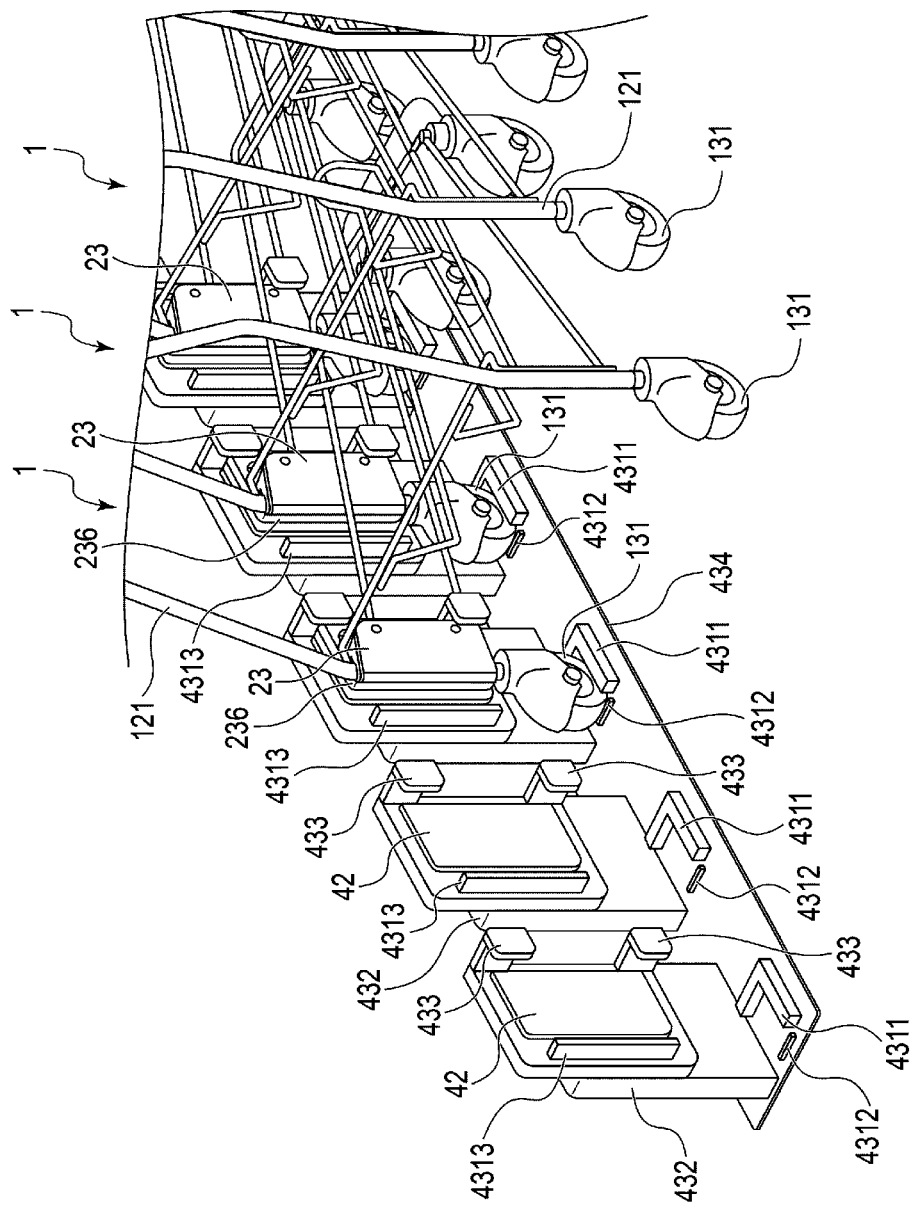
FIG. 7 illustrates a perspective view of a power transmission device according to another embodiment.

In the example described above, the power feeding device 2 includes the plurality of supporting members 43. However, the power feeding device 2 is not limited to this. For example, the power feeding device 2 may include a single supporting member 43. The single supporting member 43 may support the plurality of power transmission devices 42. For example, such a single supporting member 43 includes, as illustrated in FIG. 7, a single base 434 long in the traveling direction of the cart 1. A plurality of rear wheel guides 4311 and a plurality of wall sections 432 are provided on the base 434. The single supporting member 43 may include a single base 434 long in the traveling direction of the cart 1 and a single wall section. The plurality of rear wheel guides 4311 may be provided on the base 434. The plurality of engaging sections 433 may be provided in the single wall section.

In the example described above, a part of the rear wheel guide 4311 extends along the traveling direction to restrict movement in the width directions of the rear wheel 131 (the cart 1). However, the rear wheel guide 4311 is not limited to this. That is, the rear wheel guide 4311 only has to be able to restrict movement in the width directions of the rear wheel 131. A part of the rear wheel guide 4311 may incline and extend with respect to the traveling direction.

Figure 8:
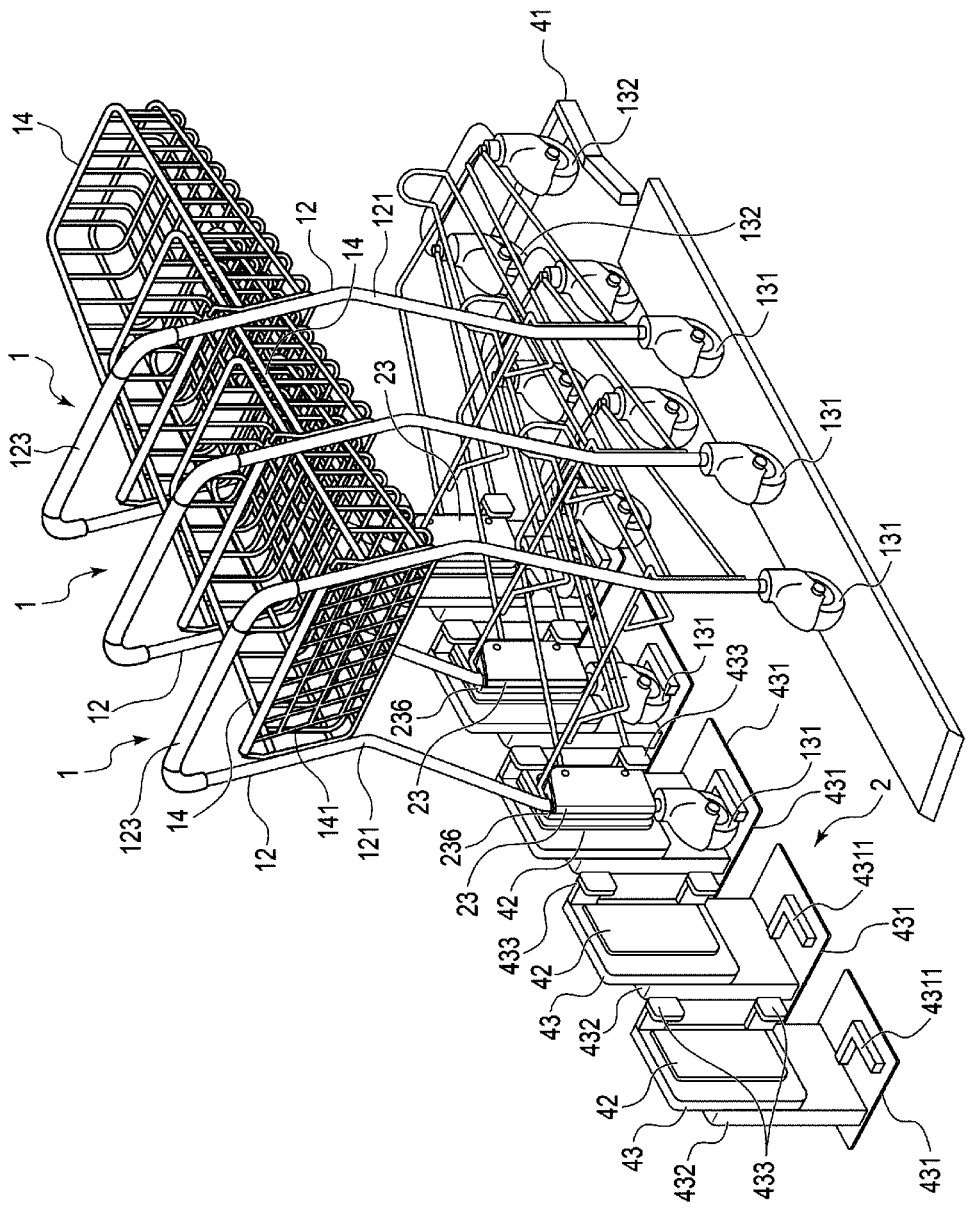
FIG. 8 illustrates a perspective view of a power feeding device according to another embodiment.
Figure 9:
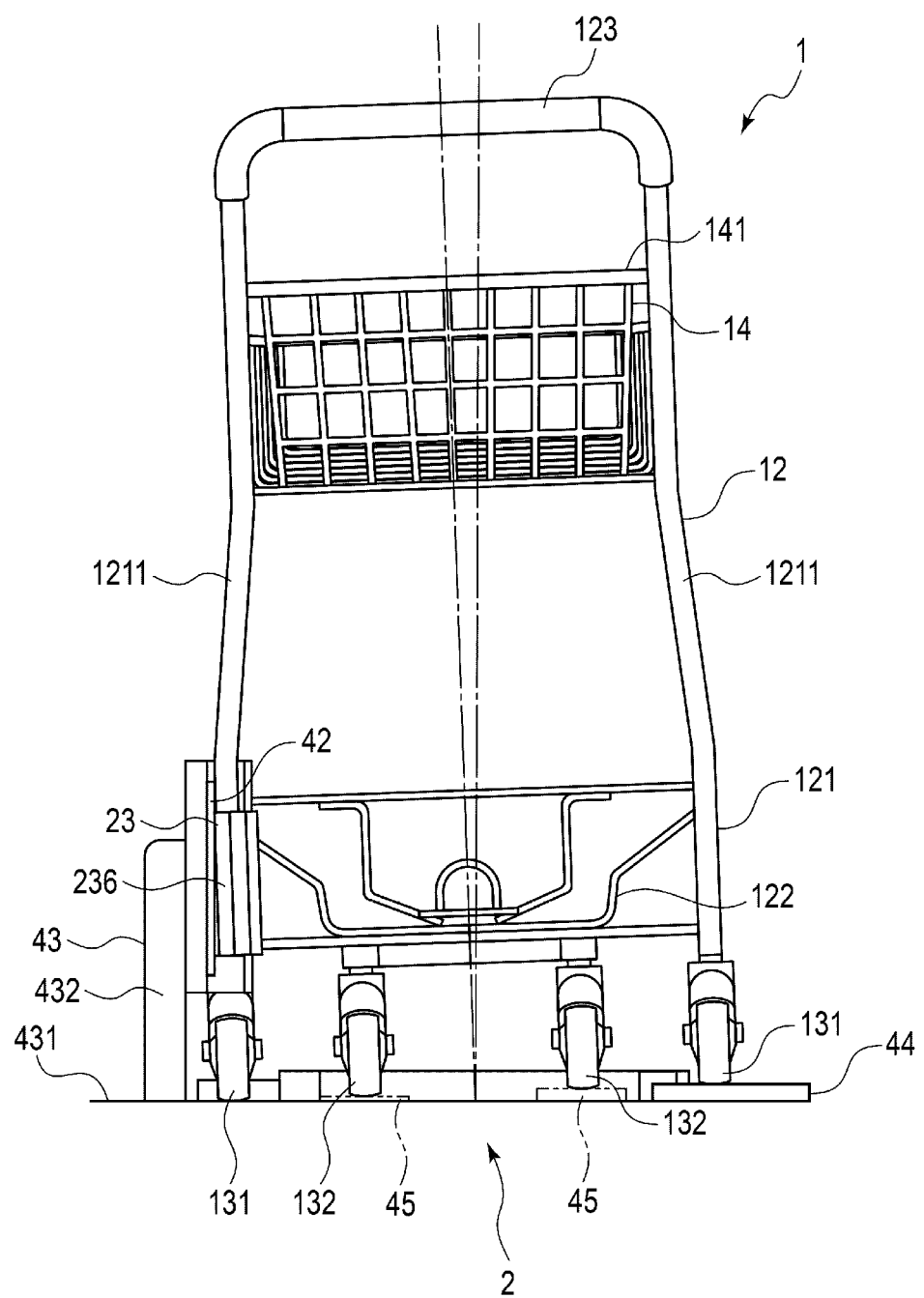
FIG. 9 illustrates a side view of a power feeding device illustrated in FIG. 8.

In the example described above, the power feeding device 2 includes the cart guide 41, the plurality of power transmission devices 42, and the single or the plurality of supporting members 43. However, the power feeding device 2 is not limited to this. For example, as illustrated in FIGS. 8 and 9, the power feeding device 2 includes, in addition to the cart guide 41, the plurality of power transmission devices 42, and the single or the plurality of supporting members 43, and an adjustment plate 44 for adjusting the posture of the cart 1. At least the rear wheel 131 disposed on the base 431 and the rear wheel 131 on the opposite side can be disposed on the adjustment plate 44. The adjustment plate 44 is set to height equal to or larger than the height of the upper surface of the base 431.

As illustrated in FIGS. 8 and 9, the upper surface of the adjustment plate 44 is set to be higher than the upper surface of the base 431. The rear wheel 131 of the cart 1 runs on the base 431 and the adjustment plate 44, whereby, as illustrated in FIGS. 8 and 9, the cart 1 inclines to lower the side where the power reception device 23 is provided. In an example illustrated in FIGS. 8 and 9, the height of the adjustment plate 44 is set to be 2 cm larger than the height of the base 431 to incline the cart 1 to the left side approximately 2 degrees. Since the cart 1 is inclined by the adjustment plate 44 towards the lower the power reception device 23 side in this way, the power feeding device 2 can prevent the cart 1 from moving in a direction in which the power reception device 23 separates from the power transmission device 42. Accordingly, the power feeding device 2 can prevent the power reception device 23 from separating from the power transmission device 42 and thus stopping power feeding. If the cart 1 is inclined by the adjustment plate 44, the cart 1 does not move in the direction away from the power transmission device 42. Therefore, the power feeding device 2 need not include the rear wheel guides 4311 in this example.

In some examples, the height of the adjustment plate 44 may be set to the same height as the height of the base 431. If the base 431 and the adjustment plate 44 have the same height, the cart 1 does not incline one or the other. Therefore, it is possible to prevent the cart 1 from moving in the direction in which the power reception device 23 separates from the power transmission device 42.

If the cart 1 is inclined by the adjustment plate 44, it is likely that the front wheels 132 may float above the floor surface illustrated in FIG. 9. Therefore, if the front wheels 132 lift away from the floor surface, as indicated by an alternate long and two short dashes line in FIG. 9, the power feeding device 2 may further include plate-like members 45 that fill the gaps between the floor surface and the front wheels 132. Such members 45 can be disposed in regions where the front wheels 132 of the plurality of carts 1 are to be disposed. If lifting heights from the floor surface are different for the left and right front wheels 132, the heights of the members 45 can be set to have different heights.

In an example described above, the two casters 13 forming the rear wheels are provided on the vertical frame 121. The two casters 13 forming the front wheels are provided on the horizontal frame 122. However, a cart 1 is not limited to this arrangement. For example, the four casters 13 may be provided on the horizontal frame 122. The configuration of the cart main body 11 can be adjusted as appropriate.

In an example described above, a plurality of engaging sections 433 are provided. However, the engaging sections 433 can be set as appropriate so long as the engaging sections 433 can guide the position of the power reception device 23 in the traveling direction of the cart 1. For example, a single engaging device 433 may be provided in the wall section 432. The engaging sections 433 may be deformable in the rearward direction along the traveling direction of the cart 1. That is, the engaging sections 433 may support the power reception device 23 just during frontward movement along the traveling direction of the cart 1. If the power reception device 23 comes into contact with the engaging sections 433 in rearward movement along the traveling direction of the cart 1, the engaging sections 433 may be formed so as not to hinder the movement of the cart 1.

According to the at least one embodiment described above, it is possible to provide a power feeding device in which power transmission and reception surfaces can be appropriately aligned.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cart charging station, for providing power to carts with a power reception device mounted thereon, the cart charging station comprising:
   a supporting member;
   a power transmission device positioned on the supporting member such that a power transmission surface of the power transmission device faces a power receiving surface of a power reception device on a cart at the cart charging station, the power transmission device configured to transmit electric power to the power reception device in a non-contact manner;
   an engaging member configured to engage the power reception device of the cart and restrict movement of the cart in a frontward direction and width directions of the cart; and
   an adjustable plate on which one rear wheel of the cart can be placed, the adjustable plate being adjustable such that another rear wheel of the cart can be higher than the other in a height direction.

2. A cart charging station, comprising:
   a first power feeding unit including:
      a first supporting member;
      a first power transmission device positioned on the first supporting member such that a power transmission surface of the first power transmission device faces a power receiving surface of a power reception device on a first cart at the cart charging station, the first power transmission device configured to transmit electric power to the power reception device of the first cart in a non-contact manner;
      a first engaging member configured to engage the power reception device of the first cart and restrict movement in a frontward direction and width directions of the first cart; and
      a restricting member configured to restrict movement of the power reception device of the first cart, which is provided separately from wheels of the first cart, in a rearward direction of the first cart by physical contact with the power reception device of the first cart; and
   a second power feeding unit including:
      a second supporting member; and
      a second power transmission device positioned on the second supporting member such that a power transmission surface of the second power transmission device faces a power receiving surface of a power reception device on a second cart stacked behind the first cart, the second power transmission device configured to transmit electric power to the power reception device of the second cart in a non-contact manner,
   wherein a distance between the first power feeding unit and the second power feeding unit is adjustable.

3. The cart charging station according to claim 2, wherein the second power feeding unit includes a second engaging member configured to engage with the power reception device of the second cart and restrict movement of the power reception device of the second cart in a frontward direction and width directions of the second cart.

4. The cart charging station according to claim 2, further comprising:
   a front wheel guide configured to restrict movement of at least one of front wheel of the first cart in the frontward direction.

5. The cart charging station according to claim 4, wherein the front wheel guide is further configured to restrict movement of the at least one of front wheel of the first cart in one width direction of the first cart.

6. The cart charging station according to claim 2, further comprising:
   a second restricting member configured to restrict movement of the power reception device of the second cart, which is provided separately from wheels of the second cart, in a rearward direction of the second cart by physical contact with the power reception device of the second cart.

7. A cart charging station, comprising:
   a first power feeding unit including:
      a first supporting member;

a first power transmission device positioned on the first supporting member such that a power transmission surface of the first power transmission device faces a power receiving surface of a power reception device on a first cart at the cart charging station, the first power transmission device configured to transmit electric power to the power reception device of the first cart in a non-contact manner; and a first engaging member configured to engage the power reception device of the first cart and restrict movement in a frontward direction and width directions of the first cart; and a second power feeding unit including:

a second supporting member; and a second power transmission device positioned on the second supporting member such that a power transmission surface of the second power transmission device faces a power receiving surface of a power reception device on a second cart stacked behind the first cart, the second power transmission device configured to transmit electric power to the power reception device of the second cart in a non-contact manner, wherein a distance between the first power feeding unit and the second power feeding unit is adjustable.

* * * * *